(12) United States Patent
Villanueva

(10) Patent No.: US 7,112,893 B1
(45) Date of Patent: Sep. 26, 2006

(54) POWER GENERATING WIND TURBINE

(76) Inventor: Alvin P. Villanueva, 1061 Nicklaus Ave., Milpitas, CA (US) 95035

( * ) Notice: Subject to any disclaimer, the term of this patent is extended or adjusted under 35 U.S.C. 154(b) by 0 days.

(21) Appl. No.: 11/080,335

(22) Filed: Mar. 16, 2005

(51) Int. Cl.
*F03D 9/00* (2006.01)

(52) U.S. Cl. .................. 290/55; 290/44; 60/641.11

(58) Field of Classification Search .............. 290/43, 290/44, 54, 55; 60/641.11, 641.12; 415/64, 415/148
See application file for complete search history.

(56) References Cited

U.S. PATENT DOCUMENTS

| | | | |
|---|---|---|---|
| 1,321,415 A | | 11/1919 | Brown |
| 3,936,652 A | | 2/1976 | Levine |
| 4,016,725 A | * | 4/1977 | Fiss .............................. 60/690 |
| 4,031,173 A | | 6/1977 | Rogers |
| 4,036,916 A | | 7/1977 | Agsten |
| 4,070,131 A | * | 1/1978 | Yen ............................. 415/4.4 |
| 4,236,866 A | * | 12/1980 | Zapata Martinez .......... 415/4.4 |
| 4,963,761 A | * | 10/1990 | Wight ........................... 290/55 |
| 5,395,598 A | | 3/1995 | Prueitt |
| 6,215,199 B1 | * | 4/2001 | Lysenko et al. ............... 290/44 |
| 6,590,300 B1 | * | 7/2003 | Preito Santiago ............ 290/55 |
| 6,717,285 B1 | * | 4/2004 | Ferraro ......................... 290/55 |

* cited by examiner

*Primary Examiner*—Nicholas Ponomarenko

(57) ABSTRACT

A turbine system includes a rigid frame including a plurality of elongated rectilinear beams. The rigid frame spans across a top portion of a cooling tower and is axially registered with the passageway for receiving a unidirectional convection air stream upwardly therethrough. At least one generator fan is coaxially registered above the cooling tower and has a plurality of equidistantly offset blades operably coupled thereto. The generator fan is conjoined to the frame and protrudes downwardly therefrom. A plurality of generator motors are fastened to the rigid frame and are oppositely situated from the generator fan. The turbine system further includes a mechanism for directly transferring kinetic energy from the generator fan to the generator motors such that a regulated quantity of electrical energy can be created for consumption. The generator motors are operably coupled and synchronized with an AC power grid for transmission and distribution.

12 Claims, 4 Drawing Sheets

POWER GENERATING WIND TURBINE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to energy recapturing devices and, more particularly, to a power generating wind turbine that captures the energy of convection currents rising off the warm waters of power plant cooling towers.

2. Prior Art

In thermoelectric generating plants such as steam or nuclear electric generating plants, a recirculating water system through the plant is required in which the water is heated during passage through the plant by the electric generating operation, as is well understood by those with ordinary skill in the art. This heated water was previously dumped into lakes or rivers for cooling and water from the lakes or rivers was circulated back into the plant. Thus, the heat generated in the water was lost, with a resultant loss of energy.

More recently, Federal and State regulations have prohibited the dumping of heated water from a thermoelectric generating plant directly into neighboring rivers or lakes, and therefore, electric generating plants have begun to use cooling towers of either the forced draft type in which a fan or other mechanism causes the flow of air through the cooling tower and consumes additional energy, or the natural draft type in which a natural draft of air is created through the cooling tower for cooling of the hot water before recirculation to the plant. While these systems accomplished cooling of the water and eliminated the dumping of hot water into neighboring streams or lakes, these systems also caused heat loss and resultant loss of energy in the electric generating plant operation.

Accordingly, a need remains for an energy recapture device to overcome the above-noted shortcomings. The present invention satisfies such a need by providing a power generating wind turbine that captures the energy of convection currents rising off the warm waters of power plant cooling towers. Such a wind turbine would offer a reliable and consistent energy source when compared to typical windmill installations and further utilizes recaptured energy that may currently be lost.

BRIEF SUMMARY OF THE INVENTION

In view of the foregoing background, it is therefore an object of the present invention to provide an apparatus for a wind-driven turbine system for generating electricity in combination with a cooling tower having a water basin in fluid communication with a vented passageway and a plurality of cooling vanes rotating on a central spindle. These and other objects, features, and advantages of the invention are provided by a turbine system including a rigid frame including a plurality of elongated rectilinear beams conjoined to the cooling tower and juxtaposed above the cooling tower vanes at a predetermined height. The rigid frame spans across a top portion of the cooling tower and is axially registered with the passageway for receiving a unidirectional convection air stream upwardly therethrough. Such beams are sufficiently spaced apart for allowing the convection air stream to readily pass through the rigid frame.

At least one generator fan is coaxially registered above the vanes and has a plurality of equidistantly offset blades operably coupled thereto. The generator fan is conjoined to the frame and protrudes downwardly therefrom. A plurality of generator motors are fastened to the rigid frame and are oppositely situated from the generator fan. The generator fan is situated exterior of the cooling tower such that ambient air currents can rotate the blades independently from the convection air stream generated by the cooling tower.

The turbine system further includes a mechanism for directly transferring kinetic energy from the turbine fan to the generator motors such that a regulated quantity of electrical energy can be created for consumption. The generator motors are operably coupled and synchronized with an AC power grid for transmission and distribution. The generator motors include one generator selected from the group including a DC generator, an AC generator and any combination thereof.

The energy transferring mechanism (Direct Drive Generator Assembly) includes a gear box including an associated gear drive housed therein. The gear drive is operably engageable in a predetermined direction corresponding to the rotational movement of the blades during operating conditions. A plurality of rectilinear drive shafts having opposed end portions are operably conjoined to the gear drive and the generator motors respectively such that the drive shafts can be registered along a substantially horizontal plane. Each of the drive shafts cooperates with the generator motors for creating electrical energy from the convection currents emanating from the cooling tower. Each of the generator motors is independently and simultaneously operable by the gear drive.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
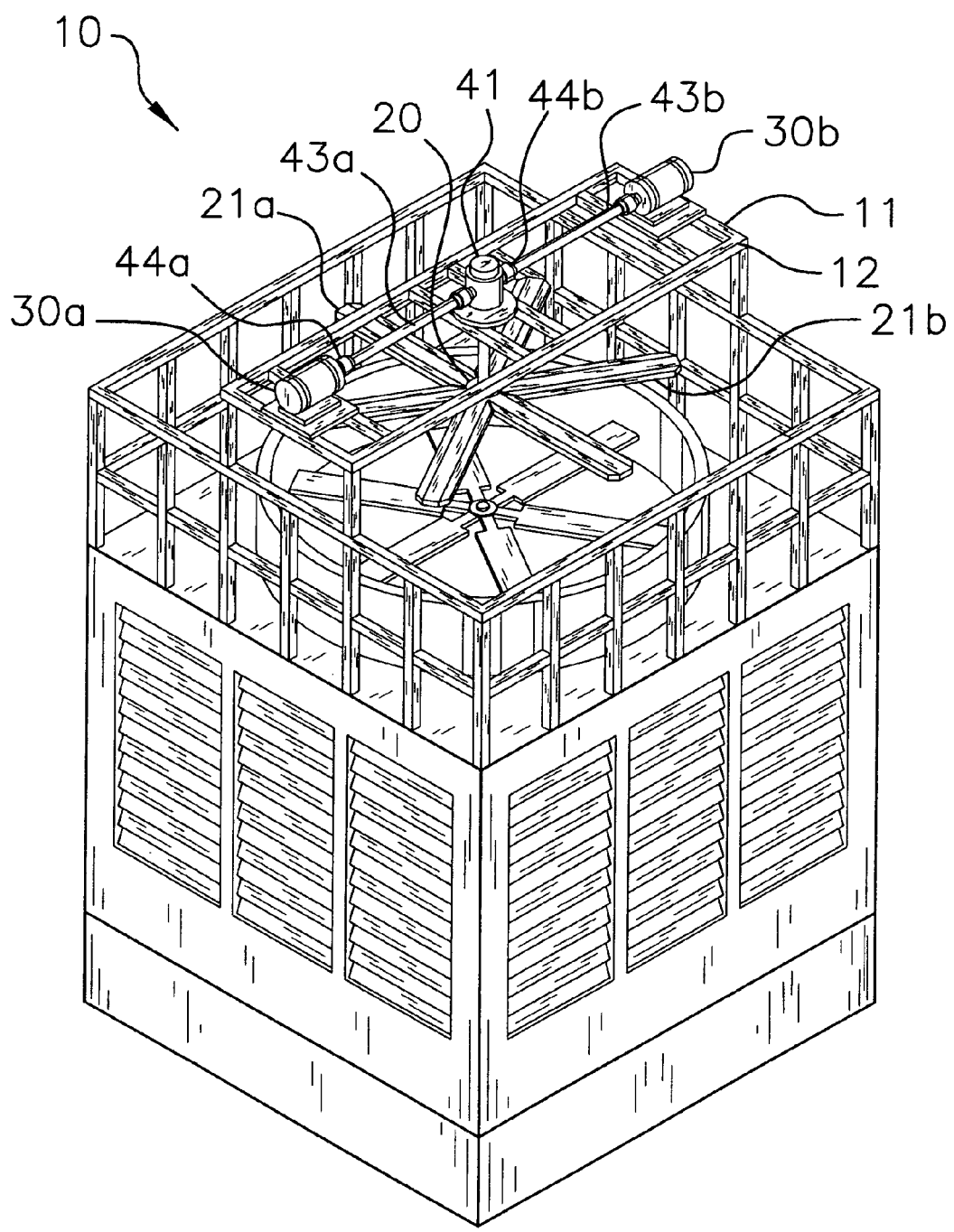
FIG. 1 is a perspective view illustrating the energy recapture and power generating process, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–4 by the reference numeral 10 and is intended to provide a wind-driven turbine system for generating electricity in combination with a cooling tower having a water basin in fluid communication with a vented passageway and a plurality of cooling vanes rotating on a central spindle. It should be understood that the turbine system 10 may be used to generate electricity in many different applications and in combination with many different cooling methods and should not be limited to use only with a cooling tower.

Figure 2:
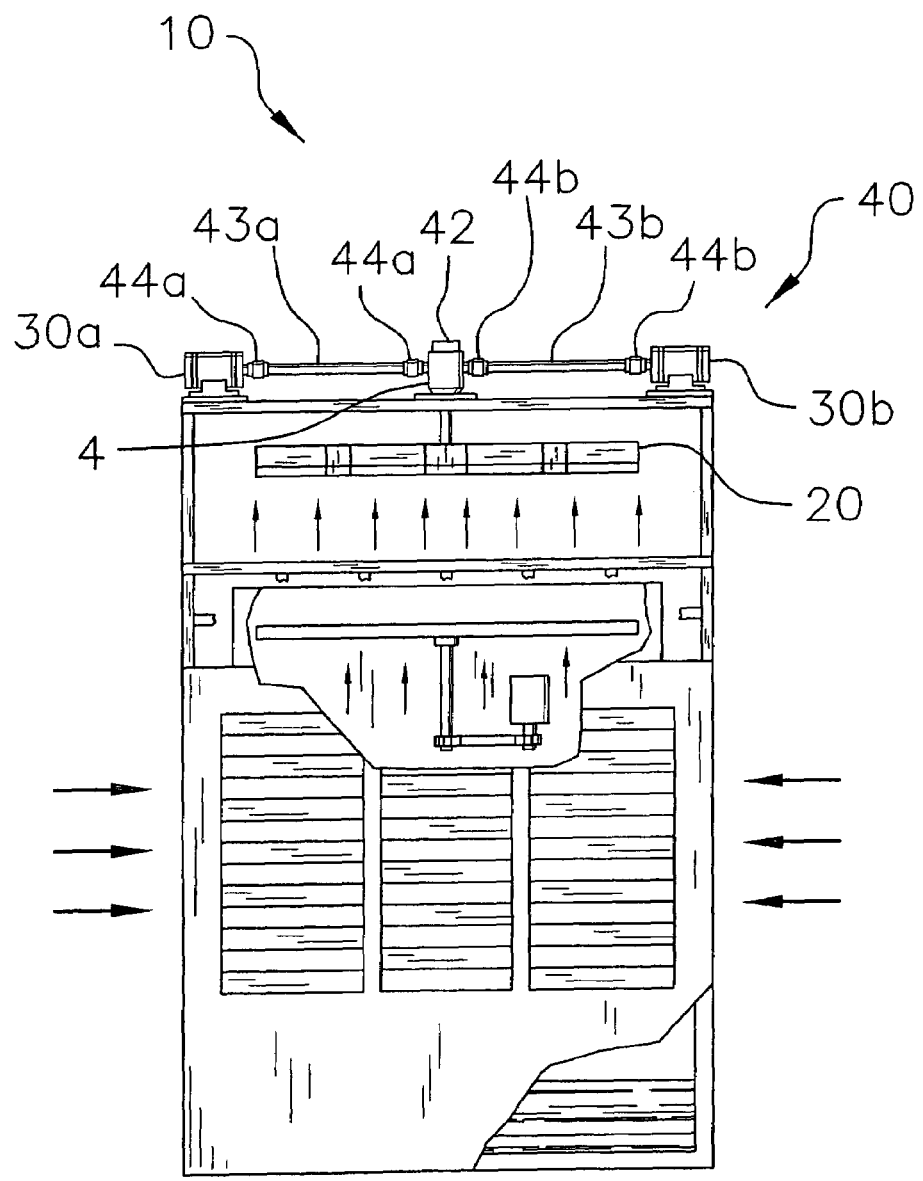
FIG. 2 is a partially exposed front elevational view of the present invention shown if FIG. 1 illustrating the air flow.

Initially referring to FIG. 1, the turbine system 10 includes a rigid frame 11 including a plurality of elongated rectilinear beams 12 conjoined to a power cooling tower and juxtaposed above the cooling tower vanes at a predetermined height. The rigid frame 11 spans across a top portion of the cooling tower and is axially registered with the passageway for receiving a unidirectional convection air stream upwardly therethrough, as shown in FIG. 2. Such beams 12 are sufficiently spaced apart for allowing the convection air stream to readily pass through the rigid frame 11.

Still referring to FIG. 1, at least one generator fan 20 is coaxially registered above the vanes and has a plurality of equidistantly offset blades 21 operably coupled thereto. Such blades 21 are preferably formed from galvanized metal or stainless steel to resist corrosion in an outdoor environment. The generator fan 20 is conjoined to the frame 11 and protrudes downwardly therefrom, advantageously enabling ambient wind to also contribute to its operation in areas where a sustained and consistent wind direction is commonplace. A plurality of generator motors 30(a, B) are fastened to the rigid frame 11 and are oppositely situated from the generator fan 20 in order to maximize the potential energy recapture. The generator fan 20 is situated exterior of the cooling tower such that ambient air currents can rotate the blades 21(a, B) independently from the convection air stream generated by the cooling tower.

Figure 4:
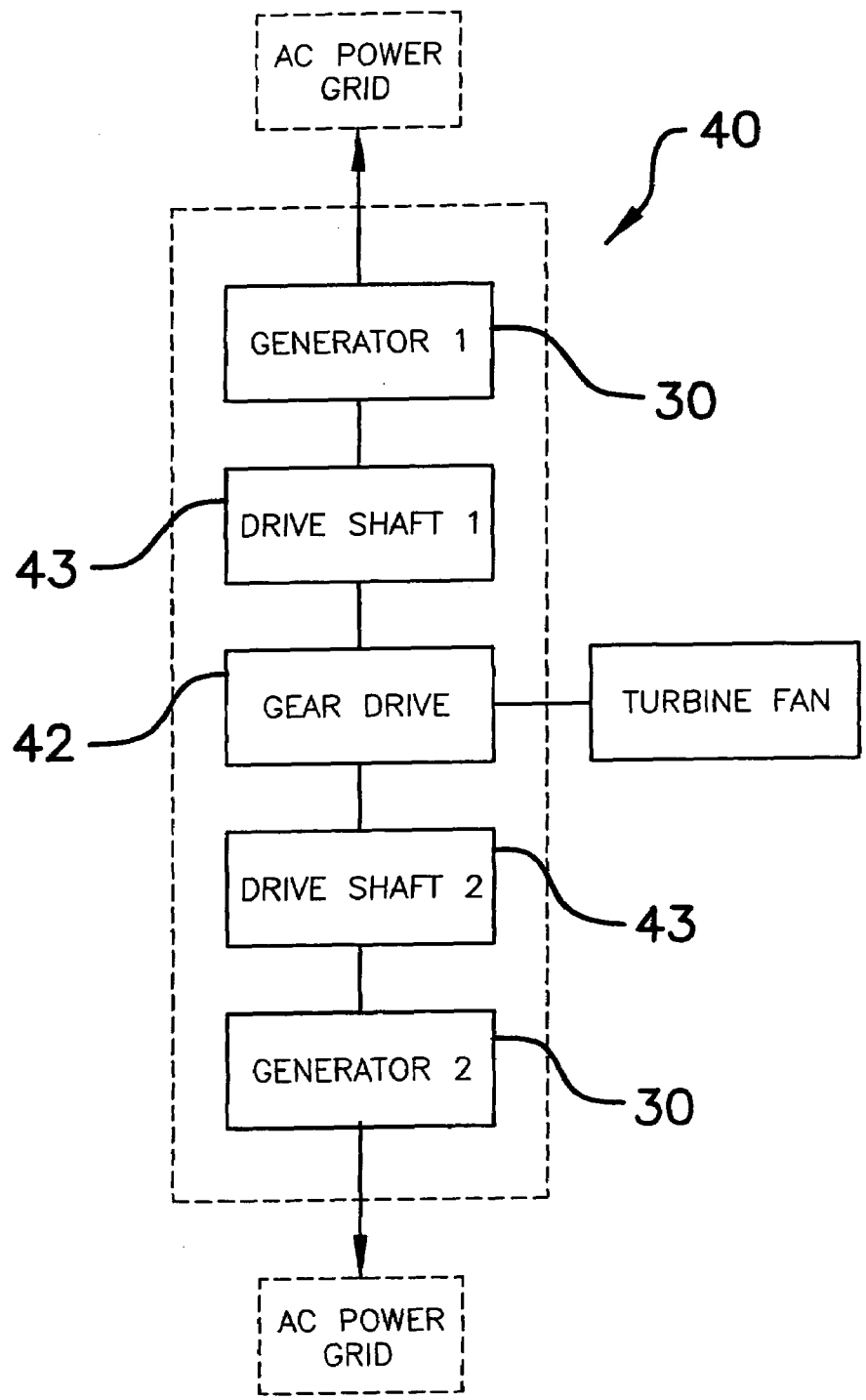
FIG. 4 is a schematic diagram of the energy transferring mechanism.

Referring to FIGS. 1, 2, and 4, the turbine system 10 further includes a mechanism 40 for direct transferring kinetic energy from the generator fan 20 to the generator motors 30(a, B) such that a regulated quantity of electrical energy can be created for consumption. The generator motors 30(a, B) are operably coupled and synchronized with an AC power grid for transmission and distribution. The generator motors 30(a, B) include one generator 30(a, B) selected from the group including a DC generator, an AC generator, and any combination thereof.

Figure 3:
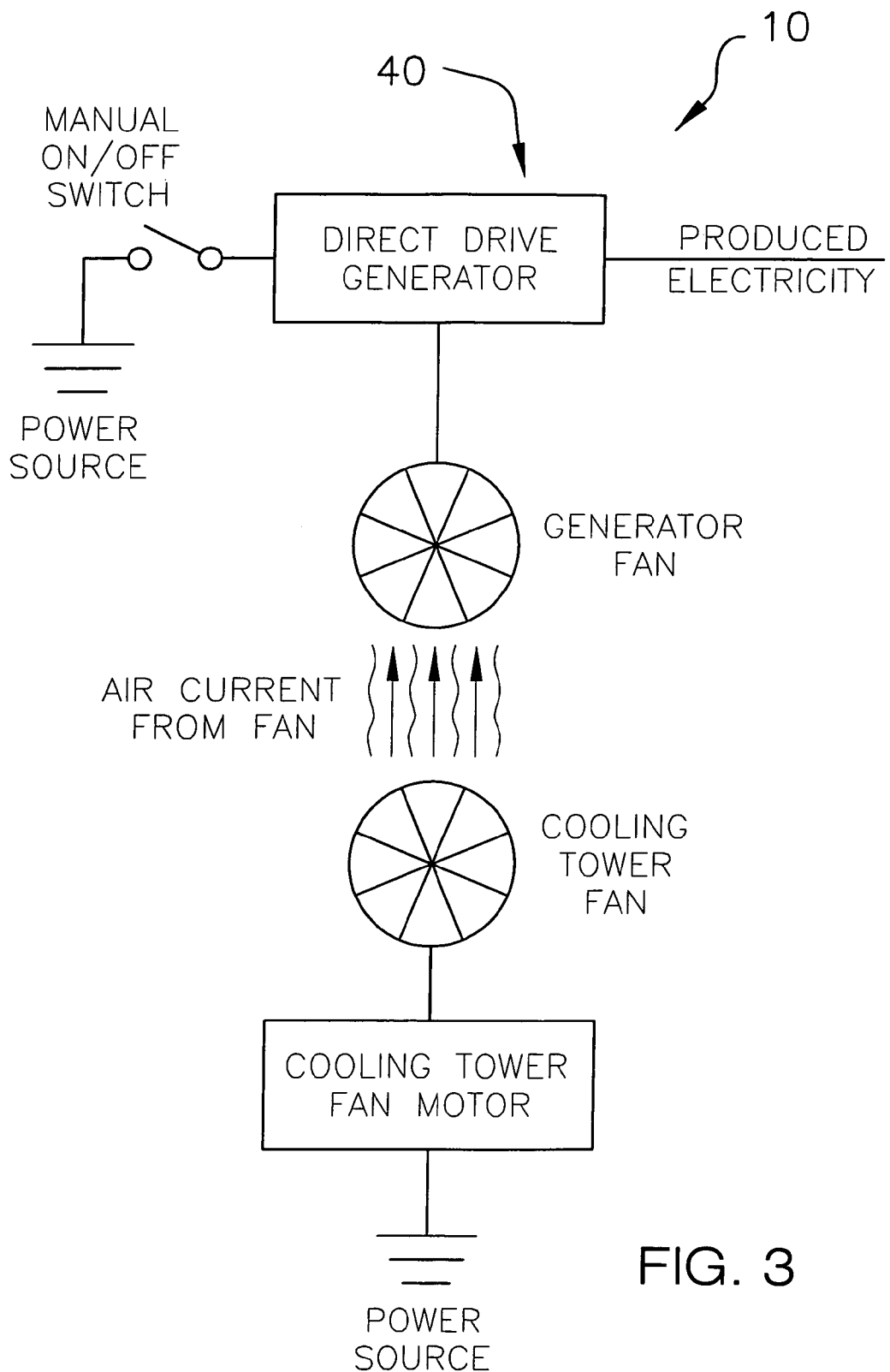
FIG. 3 is a schematic diagram of the present invention.

Referring to FIGS. 1–3, the energy transferring mechanism 40 includes a gear box 41 including an associated gear drive 42 housed therein. The gear drive 42 is operably engageable in a predetermined direction corresponding to the rotational movement of the blades 21 during operating conditions. A plurality of rectilinear drive shafts 43(a, B) having opposed end portions 44(a, B) are operably conjoined to the gear drive 42 and the generator motors 30(a, B) respectively such that the drive shafts 43(a, B) can be registered along a substantially horizontal plane. Each of the drive shafts 43(a, B) cooperates with the generator motors 30(a, B) creating electrical energy from the convection currents emanating from the cooling tower. Each of the generator motors 30(a, B) may be independently and simultaneously operable by the gear drive 42.

The turbine system 10 provides a power generating wind turbine that captures the energy of convection currents rising off the warm waters of power plant cooling towers. Such a system 10 is more consistent and reliable than conventional wind turbines because the convection currents rising off the warm waters in a power plant cooling tower are more consistent than ambient winds. Such consistency is useful for on-site power consumption or for transfer to a utility grid.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A wind-driven turbine system for generating electricity in combination with a cooling tower having a water basin in fluid communication with a vented passageway and a plurality of cooling vanes rotating on a central spindle, said turbine system comprising:

a rigid frame including a plurality of elongated rectilinear beams conjoined to the cooling tower and juxtaposed above the cooling tower vanes at a predetermined height, said rigid frame spanning across a top portion of the cooling tower and being axially registered with the passageway for receiving a unidirectional convection air stream upwardly therethrough;

at least one generator fan having a plurality of equidistantly offset blades operably coupled thereto, said generator fan being conjoined to said frame and protruding downwardly therefrom;

a plurality of generator motors fastened to said rigid frame and being oppositely situated from said generator fan; and means for directly transferring kinetic energy from said generator fan to said generator motors such that a regulated quantity of electrical energy can be created for consumption, said generator motors being operably coupled and synchronized with an AC power grid for transmission and distribution, wherein said energy transferring means comprises:

a gear box including an associated gear drive housed therein, said gear drive being operably engageable in a predetermined direction corresponding to the rotational movement of said blades during operating conditions; and a plurality of rectilinear drive shafts having opposed end portions operably conjoined to said gear drive and said generator motors respectively such that said drive shafts can be registered along a substantially horizontal plane, each said drive shafts cooperating with said generator motors for creating electrical energy from the convection currents emanating from the cooling tower.

2. The turbine system of claim 1, wherein said generator motors comprise: one generator selected from the group including a DC generator, an AC generator and any combination thereof.

3. The turbine system of claim 1, wherein each said generator motors are independently and simultaneously operable by said gear drive.

4. The turbine system of claim 1, wherein said generator fan is situated exterior of said cooling tower such that ambient air currents can rotate said blades independently from the convection air stream generated by the cooling tower.

5. A wind-driven turbine system for generating electricity in combination with a cooling tower having a water basin in fluid communication with a vented passageway and a plurality of cooling vanes rotating on a central spindle, said turbine system comprising:

a rigid frame including a plurality of elongated rectilinear beams conjoined to the cooling tower and juxtaposed above the cooling tower vanes at a predetermined height, said rigid frame spanning across a top portion of the cooling tower and being axially registered with the passageway for receiving a unidirectional convection air stream upwardly therethrough;

at least one generator fan coaxially registered above the vanes and having a plurality of equidistantly offset blades operably coupled thereto, said generator fan being conjoined to said frame and protruding downwardly therefrom;

a plurality of generator motors fastened to said rigid frame and being oppositely situated from said generator fan; and means for directly transferring kinetic energy from said generator fan to said generator motors such that a regulated quantity of electrical energy can be created for consumption, said generator motors being operably coupled and synchronized with an AC power grid for transmission and distribution, wherein said energy transferring means comprises:

a gear box including an associated gear drive housed therein, said gear drive being operably engageable in a predetermined direction corresponding to the rotational movement of said blades during operating conditions; and a plurality of rectilinear drive shafts having opposed end portions operably conjoined to said gear drive and said generator motors respectively such that said drive shafts can be registered along a substantially horizontal plane, each said drive shafts cooperating with said generator motors for creating electrical energy from the convection currents emanating from the cooling tower.

6. The turbine system of claim 5, wherein said generator motors comprise: one generator selected from the group including a DC generator, an AC generator and any combination thereof.

7. The turbine system of claim 5, wherein each said generator motors are independently and simultaneously operable by said gear drive.

8. The turbine system of claim 5, wherein said generator fan is situated exterior of said cooling tower such that ambient air currents can rotate said blades independently from the convection air stream generated by the cooling tower.

9. A wind-driven turbine system for generating electricity in combination with a cooling tower having a water basin in fluid communication with a vented passageway and a plurality of cooling vanes rotating on a central spindle, said turbine system comprising:

a rigid frame including a plurality of elongated rectilinear beams conjoined to the cooling tower and juxtaposed above the cooling tower vanes at a predetermined height, said rigid frame spanning across a top portion of the cooling tower and being axially registered with the passageway for receiving a unidirectional convection air stream upwardly therethrough, said beams being sufficiently spaced apart for allowing the convection air stream to readily pass through said rigid frame;

at least one generator fan coaxially registered above the vanes and having a plurality of equidistantly offset blades operably coupled thereto, said generator fan being conjoined to said frame and protruding downwardly therefrom;

a plurality of generator motors fastened to said rigid frame and being oppositely situated from said generator fan; and means for directly transferring kinetic energy from said generator fan to said generator motors such that a regulated quantity of electrical energy can be created for consumption, said generator motors being operably coupled and synchronized with an AC power grid for transmission and distribution, wherein said energy transferring means comprises:

a gear box including an associated gear drive housed therein, said gear drive being operably engageable in a predetermined direction corresponding to the rotational movement of said blades during operating conditions', and a plurality of rectilinear drive shafts having opposed end portions operably conjoined to said gear drive and said generator motors respectively such that said drive shafts can be registered along a substantially horizontal plane, each said drive shafts cooperating with said generator motors for creating electrical energy from the convection currents emanating from the cooling tower.

10. The turbine system of claim 9, wherein said generator motors comprise: one generator selected from the group including a DC generator, an AC generator and any combination thereof.

11. The turbine system of claim 9, wherein each said generator motors are independently and simultaneously operable by said gear drive.

12. The turbine system of claim 9, wherein said generator fan is situated exterior of said cooling tower such that ambient air currents can rotate said blades independently from the convection air stream generated by the cooling tower.

* * * * *